Dec. 23, 1941.  W. J. MORRILL  2,267,414

LAMINATED CORE CONSTRUCTION

Filed April 29, 1941

Inventor:
Wayne J. Morrill,
by Harry E. Dunham
His Attorney.

Patented Dec. 23, 1941

2,267,414

UNITED STATES PATENT OFFICE 2,267,414

LAMINATED CORE CONSTRUCTION

Wayne J. Morrill, Fort Wayne, Ind., assignor to General Electric Company, a corporation of New York Application April 29, 1941, Serial No. 390,935

6 Claims. (Cl. 171—252)

My invention relates to improvements in laminated core constructions for electrical devices and, in particular, to an improved dynamo-electric machine core member.

An object of my invention is to provide an improved and simplified laminated core construction for electrical devices.

Another object of my invention is to provide an improved dynamo-electric machine core member.

Further objects and advantages of my invention will become apparent and my invention will be better understood from the following description referring to the accompanying drawing, and the features of novelty which characterize my invention will be pointed out with particularity in the claims annexed to and forming part of this specification.

Figure 1:
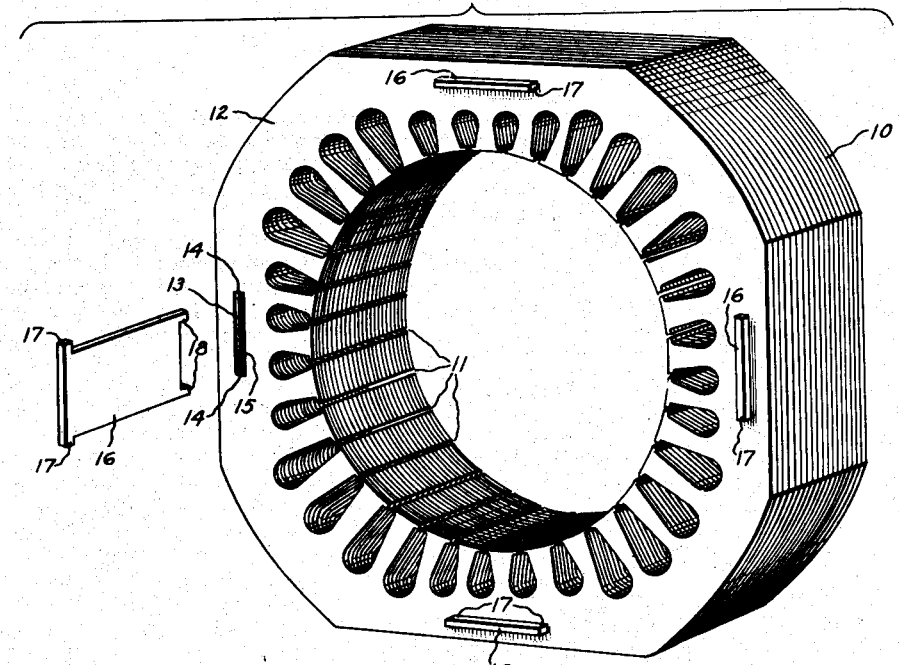
Figure 2:
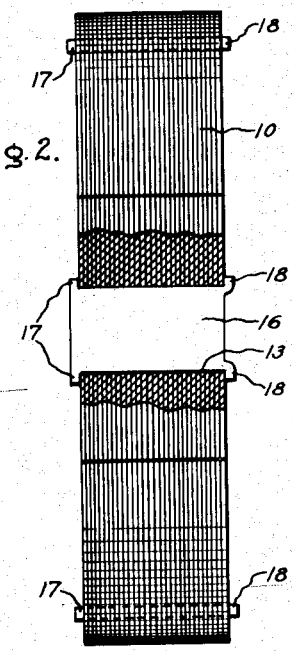

Fig. 1 is an exploded view of a laminated core for a dynamo-electric machine stationary member showing some of the rivets in position in the core and illustrating an embodiment of my invention; and Fig. 2 is a side view of the core shown in Fig. 1, partly broken away to show the arrangement of the rivets in a completely assembled core.

In the drawing, I have shown my invention in connection with a laminated core for a dynamo-electric machine stationary member including an assembly of a plurality of laminations 10 of magnetic material provided with a plurality of winding slots 11 formed about the inner periphery thereof. In such a construction, it is desirable that the core assembly securing devices will cause as little interference as possible in the magnetic flux paths in the core. However, in securing together the laminations with rivets or bolts which extend through the main body 12 of the laminations, the reluctance of the magnetic circuit usually is increased by the openings required for these securing devices. Furthermore, such rivets or bolts also tend to increase the eddy current losses in the machine. In order to minimize such losses and minimize the undesirable effects of openings in the body portion 12 of the laminations, I provide a plurality of relatively narrow openings or slots 13 which is arranged adjacent the outer periphery of the laminations with the relatively narrow sides 14 of the openings 13 extending substantially radially of the laminations and across the direction of adjacent magnetic flux paths and with the relatively wide sides 15 of the slots 13 extending substantially parallel to the outer periphery of the laminations and in the direction of adjacent flux paths respectively adapted to be set up in the laminations when they are excited in the conventional manner by windings arranged in the winding slots 11. The openings 13 are arranged in spaced apart relationship about the periphery of the laminations, and the wider dimension of these openings is made accurately to very close tolerances in all of the laminations. In order to secure together the laminations, flat rivets 16 of suitable material, such as steel, are arranged in the openings 13 and are provided with transversely extending projections 17 on one of the ends thereof to form a head for the rivet. Longitudinally extending projections 18 are formed on the other end of the rivets and are bent over, as is more clearly shown in Fig. 2, to extend transversely of the rivet for securing together the laminations in assembled relationship between the projections 17 and 18 which engage the outer surface of the outer laminations. The wider dimension of the rivets 16 is made with very close tolerances to the wider dimension of the openings 13 so that when the rivets extend through the openings 13, they engage the sides 14 of these openings and provide a tight fit in the wider direction with the sides 14 of the openings, as shown in Fig. 1. Alternate openings 13 are arranged at a substantial angle to each other, and as shown in Fig. 1 may be substantially at right angles to each other, so that the wider sides of the rivets 16 in successive order are adapted to resist different angular stresses which may be exerted upon the laminations. In this manner, the different angular arrangement of the different rivets 16 effectively resists distortion of the core due to different angular stresses. Furthermore, by arranging the rivets adjacent the outer periphery of the core away from the winding slots 11, very little flux will cut these rivets, and, therefore, the eddy current losses in the rivets will be very small and the efficiency of the machine will be correspondingly increased.

Further objects and advantages of my invention will become apparent and my invention will be better understood from the following description referring to the accompanying drawing, and the features of novelty which characterize my invention will be pointed out with particularity in the claims annexed to and forming part of this specification.

What I claim as new and desire to secure by Letters Patent of the United States, is:

1. An electrical device core including an assembly of a plurality of laminations of magnetic material, each of said laminations having a plurality of spaced apart openings therein relatively narrow across the direction of adjacent magnetic flux paths and relatively wide in the direction of adjacent magnetic flux paths adapted to be set up in said laminations, and means extending through said openings and substantially conforming thereto for securing together said laminations, said means having transversely extending projections at each end thereof engaging the outer surface of said assembled laminations for maintaining said laminations in assembled relationship.

2. An electrical device core including an assembly of a plurality of laminations of magnetic material, each of said laminations having a plurality of spaced apart openings therein relatively narrow across the direction of adjacent magnetic flux paths and relatively wide in the direction of adjacent magnetic flux paths adapted to be set up in said laminations, alternate of said lamination openings being arranged at substantially right angles to present the relatively wider sides thereof at substantially right angles, and means including substantially flat rivets extending through said openings and providing a tight fit in the wider direction with said openings for securing together said laminations.

3. An electrical device core including an assembly of a plurality of laminations of magnetic material, each of said laminations having a plurality of spaced apart openings therein relatively narrow across the direction of adjacent magnetic flux paths and relatively wide in the direction of adjacent magnetic flux paths adapted to be set up in said laminations, alternate of said lamination openings being arranged at substantially right angles to present the relatively wider sides thereof at substantially right angles, and means extending through said openings and substantially conforming thereto for securing together said laminations and for resisting different angular stresses, said means having transversely extending projections at each end thereof engaging the outer surface of said assembled laminations for maintaining said laminations in assembled relationship.

4. An electrical device core including an assembly of a plurality of laminations of magnetic material, each of said laminations having a plurality of spaced apart openings therein relatively narrow across the direction of adjacent magnetic flux paths and relatively wide in the direction of adjacent magnetic flux paths adapted to be set up in said laminations, different of said lamination openings being arranged at different angles to present the relatively wider sides thereof at different angles, and means extending through said openings and substantially conforming thereto for securing together said laminations and for resisting different angular stresses by different angularly arranged wider portions thereof, said means having transversely extending projections at each end thereof engaging the outer surface of said assembled laminations for maintaining said laminations in assembled relationship.

5. An electrical device core including an assembly of a plurality of laminations of magnetic material, each of said laminations having a plurality of spaced apart openings therein relatively narrow across the direction of adjacent magnetic flux paths and relatively wide in the direction of adjacent magnetic flux paths adapted to be set up in said laminations, different of said lamination openings being arranged at different angles to present the relatively wider sides thereof at different angles, and means including substantially flat rivets extending through said openings and providing a tight fit in the wider direction with said openings for securing together said laminations, said rivets having transversely extending projections at each end thereof engaging the outer surface of said assembled laminations for maintaining said laminations in assembled relationship.

6. A dynamo-electric machine core member including an assembly of a plurality of laminations of magnetic material, each of said laminations having a plurality of spaced apart openings therein arranged adjacent the outer periphery thereof, said openings being relatively narrow radially of said laminations and relatively wider in a direction substantially parallel to the periphery of the laminations with different of said lamination openings arranged at different angles to present the relatively wider sides thereof at different angles, and means including a substantially flat rivet extending through each of said openings and providing a tight fit in the wider direction with said openings for resisting different angular stresses, said rivets having transversely extending projections at each end thereof engaging the outer surfaces of said assembled laminations for maintaining said laminations in assembled relationship.

WAYNE J. MORRILL.